US011669363B2

(12) United States Patent
Krishnamoorthy (10) Patent No.: US 11,669,363 B2
(45) Date of Patent: *Jun. 6, 2023

(54) TASK ALLOCATIONS BASED ON COLOR-CODED REPRESENTATIONS (71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,791

(22) Filed: May 10, 2022

(65) Prior Publication Data

US 2022/0269530 A1 Aug. 25, 2022

Related U.S. Application Data

(63) Continuation of application No. 16/882,899, filed on May 26, 2020, now Pat. No. 11,366,687.

(51) Int. Cl.
*G06F 9/48* (2006.01)
*G06F 9/54* (2006.01)
(Continued)

(52) U.S. Cl.
CPC .......... *G06F 9/4843* (2013.01); *G06F 9/5027* (2013.01); *G06F 9/546* (2013.01); *G06F 11/3006* (2013.01); *G06F 11/3055* (2013.01); *G06F 11/3072* (2013.01); *G06F 2209/508* (2013.01)

(58) Field of Classification Search
CPC ...... G06F 9/4843; G06F 9/5027; G06F 9/546; G06F 11/3006; G06F 11/3055; G06F 11/3072

See application file for complete search history.

(56) References Cited

U.S. PATENT DOCUMENTS 6,480,861 B1 11/2002 Kanevsky et al.
7,003,475 B1 * 2/2006 Friedland ........... G06Q 10/0639
705/7.38

(Continued)

*Primary Examiner* — Benjamin C Wu
(74) *Attorney, Agent, or Firm* — Moore & Van Allen PLLC; Nicholas C. Russell (57) ABSTRACT

Embodiments of the present invention provide a system for intelligently optimizing the utilization of clusters. The system is configured to continuously gather real-time hardware telemetric data associated with one or more entity systems via a hardware telemetric device, continuously convert the real-time hardware telemetric data into a first color coded representation, receive one or more tasks associated with one or more entity applications, queue the one or more tasks associated with the one or more entity applications, determine hardware requirements associated with the one or more tasks, determine one or more attributes associated with the one or more tasks, convert the hardware requirements and the one or more attributes of the one or more tasks into a second color coded representation, and allocate the one or more tasks to the one or more entity systems based on the first color coded representation and the second color coded representation.

19 Claims, 6 Drawing Sheets

(51) Int. Cl.
*G06F 9/50* (2006.01)
*G06F 11/30* (2006.01)

(56) References Cited

U.S. PATENT DOCUMENTS

| | | | |
|---|---|---|---|
| 7,356,770 B1 * | 4/2008 | Jackson | G06F 9/5072 |
| | | | 715/969 |
| 7,502,747 B1 | 3/2009 | Pardo et al. | |
| 7,865,896 B2 | 1/2011 | Coppinger et al. | |
| 8,087,026 B2 | 12/2011 | Zhong | |
| 8,332,863 B2 | 12/2012 | Zhong | |
| 8,533,724 B1 | 9/2013 | Theimer et al. | |
| 8,868,766 B1 | 10/2014 | Theimer et al. | |
| 9,703,285 B2 | 7/2017 | Zhong | |
| 10,129,126 B2 | 11/2018 | Dintenfass et al. | |
| 10,331,484 B2 | 6/2019 | Lowney et al. | |
| 11,086,688 B2 | 8/2021 | Bishop et al. | |
| 11,150,995 B1 | 10/2021 | Dhoolam et al. | |
| 11,366,687 B2 * | 6/2022 | Krishnamoorthy | G06F 9/4843 |
| 2003/0006988 A1 | 1/2003 | Alford, Jr. et al. | |
| 2005/0283786 A1 * | 12/2005 | Dettinger | G06Q 10/10 |
| | | | 718/104 |
| 2009/0222531 A1 * | 9/2009 | London | H04L 67/025 |
| | | | 709/217 |
| 2014/0006416 A1 | 1/2014 | Leslie et al. | |
| 2016/0170811 A1 * | 6/2016 | Peacock | G06F 9/52 |
| | | | 718/106 |
| 2017/0109206 A1 * | 4/2017 | Wang | G06F 9/4881 |
| 2019/0286486 A1 | 9/2019 | Ma et al. | |
| 2020/0257968 A1 * | 8/2020 | Mitra | G06F 9/4881 |
| 2020/0366697 A1 | 11/2020 | Vittal | |

* cited by examiner

TASK ALLOCATIONS BASED ON COLOR-CODED REPRESENTATIONS

CROSS-REFERENCE TO RELATED APPLICATION

The present application is a continuation of co-pending U.S. patent application Ser. No. 16/882,899, of the same title and filed on May 26, 2020, which is assigned to the assignee hereof and the contents thereof are hereby expressly incorporated by reference.

BACKGROUND

Conventional systems do not have the capability to efficiently optimize the utilization of cluster. As such, there exists a need for a system that controls and optimizes the utilization of clusters.

BRIEF SUMMARY

The following presents a summary of certain embodiments for the invention. This summary is not intended to identify key or critical elements of all embodiments nor delineate the scope of any or all embodiments. Its sole purpose is to present certain concepts and elements of one or more embodiments in a summary from as a prelude to the more detailed description that follows.

Embodiments of the present invention address the above needs and/or achieve other advantages by providing apparatuses (e.g., a system, computer program product and/or other devices) and methods for intelligently optimizing the utilization of clusters. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention continuously gathers real-time hardware telemetric data associated with one or more entity systems via a hardware telemetric device, continuously converts the real-time hardware telemetric data into a first color coded representation, receives one or more tasks associated with one or more entity applications, queues the one or more tasks associated with the one or more entity applications, determines hardware requirements associated with the one or more tasks, determines one or more attributes associated with the one or more tasks, converts the hardware requirements and the one or more attributes of the one or more tasks into a second color coded representation, and allocates the one or more tasks to the one or more entity systems based on the first color coded representation and the second color coded representation.

In some embodiments, the one or more tasks are associated with at least a first application, a second application, and a third application of the one or more entity application.

In some embodiments, the present invention identifies that a first task and a second task of the one or more tasks are associated with updating same resource, wherein the first task is associated with the first application and the second task is associated with the second application and places at least one of the first task and the second task on hold based on the second color coded representation associated with the first task and the second task.

In some embodiments, the present invention determines that the first task has a highest priority based on the second color coded representation of the first task and in response to determining that the first task has the highest priority, place the second task on hold until the first task is complete.

In some embodiments, the present invention allocating the one or more tasks to the one or more entity systems based on determining current utilization of the one or more entity systems based on the first color coded representation, determining completion of existing tasks running on the one or more entity systems based on the first color coded representation, and in response to determining the completion of the existing tasks, dynamically assign the one or more tasks to the one or more entity systems.

In some embodiments, the real-time hardware telemetric data comprises at least usage data associated with processors and memory units of the one or more entity systems.

In some embodiments, the hardware requirements comprise at least memory, processor consumption, wherein the one or more attributes comprises at least shared resources data, historical abnormal execution data, input updates, output updates, and prioritization data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources provided by an entity or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Figure 1:
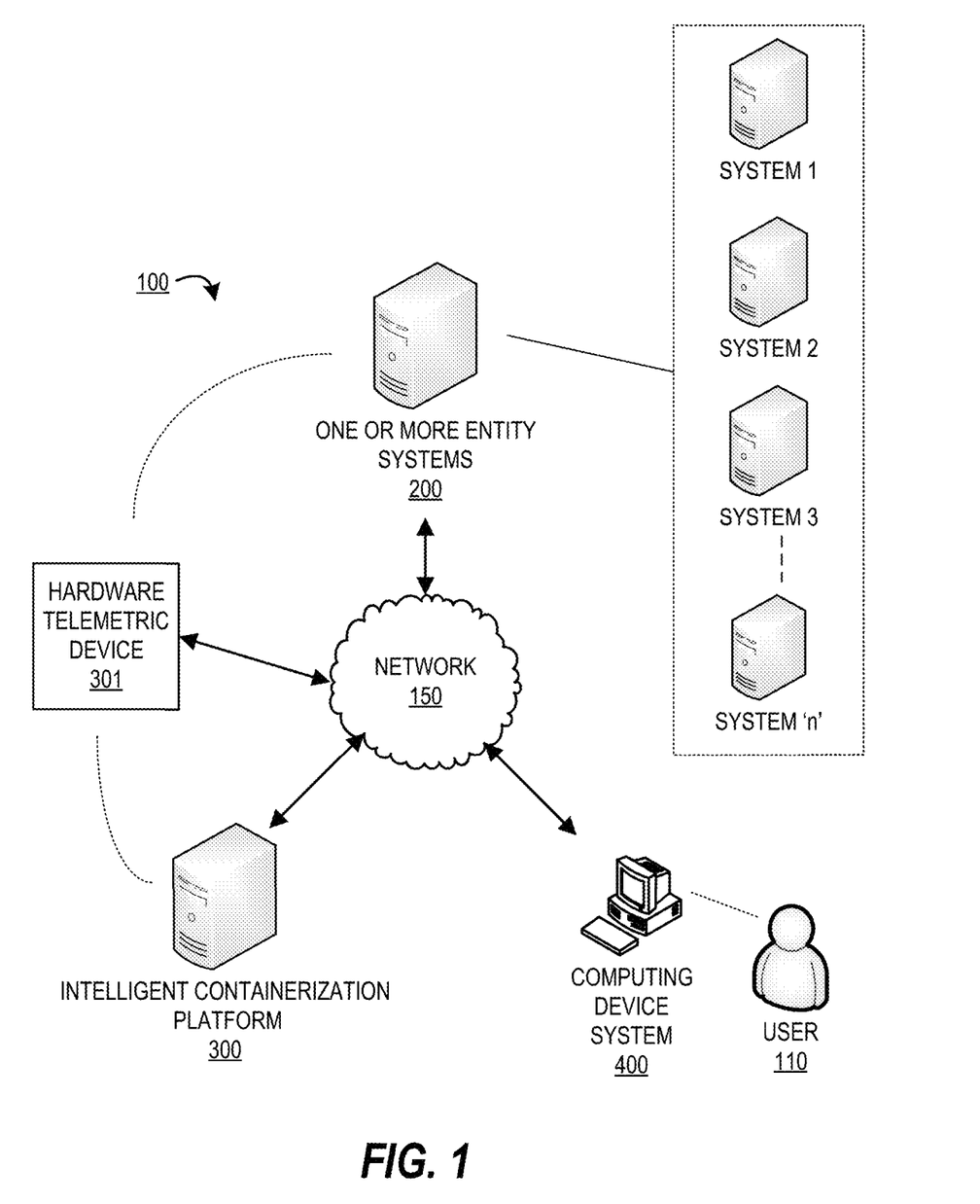
FIG. 1 provides a block diagram illustrating a system environment for intelligently optimizing the utilization of clusters, in accordance with an embodiment of the invention.

FIG. 1 provides a block diagram illustrating a system environment 100 for intelligently optimizing the utilization of clusters, in accordance with an embodiment of the invention. As illustrated in FIG. 1, the environment 100 includes an intelligent containerization platform 300, a hardware telemetric device 301, one or more entity systems 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the one or more entity systems 200. For example, employees may be application developers or employees who maintain applications and manage resources.

The one or more entity systems 200 may be any system owned or otherwise controlled by an entity to support or perform one or more process steps described herein. In some embodiments, the entity is a financial institution. In some embodiments, the entity is a non-financial institution. As shown one or more entity systems 200 may comprises 'n' number of resources (e.g., large production environments) that are configured to one or more jobs associated with one or more entity applications. For example, every application needs to be updated or a database associated with every application needs timely updates. As such, CPU and memory is required to run the updates on databases and applications. Entity assigns a separate set of systems to run these updates on applications and databases.

The intelligent containerization platform 300 is a system of the present invention for performing one or more process steps described herein. In some embodiments, the intelligent containerization platform 300 may be an independent system. In some embodiments, the intelligent containerization platform 300 may be a part of the one or more entity systems 200.

In some embodiments, the hardware telemetric device 301 may be provided by the entity, where the hardware telemetric device 301 gathers hardware telemetric data associated with the one or more entity systems 200 (System '1', System '2', System '3', . . . System 'n') and provides the hardware telemetric data to the intelligent containerization platform 300. System '1', System '2', System '3', . . . System 'n' are cluster of systems that are configured to host applications and/or perform tasks associated with the one or more entity applications associated with the entity.

The intelligent containerization platform 300, the hardware telemetric device 301, the one or more entity systems 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the intelligent containerization platform 300 is configured to communicate information or instructions with the one or more entity systems 200, the hardware telemetric device 301, and/or the computing device system 400 across the network 150.

The computing device system 400 may be a system owned or controlled by the entity of the one or more entity systems 200 and/or the user 110. As such, the computing device system 400 may be a computing device of the user 110. In general, the computing device system 400 communicates with the user 110 via a user interface of the computing device system 400, and in turn is configured to communicate information or instructions with the intelligent containerization platform 300, the hardware telemetric device 301, and/or one or more entity systems 200 across the network 150.

Figure 2:
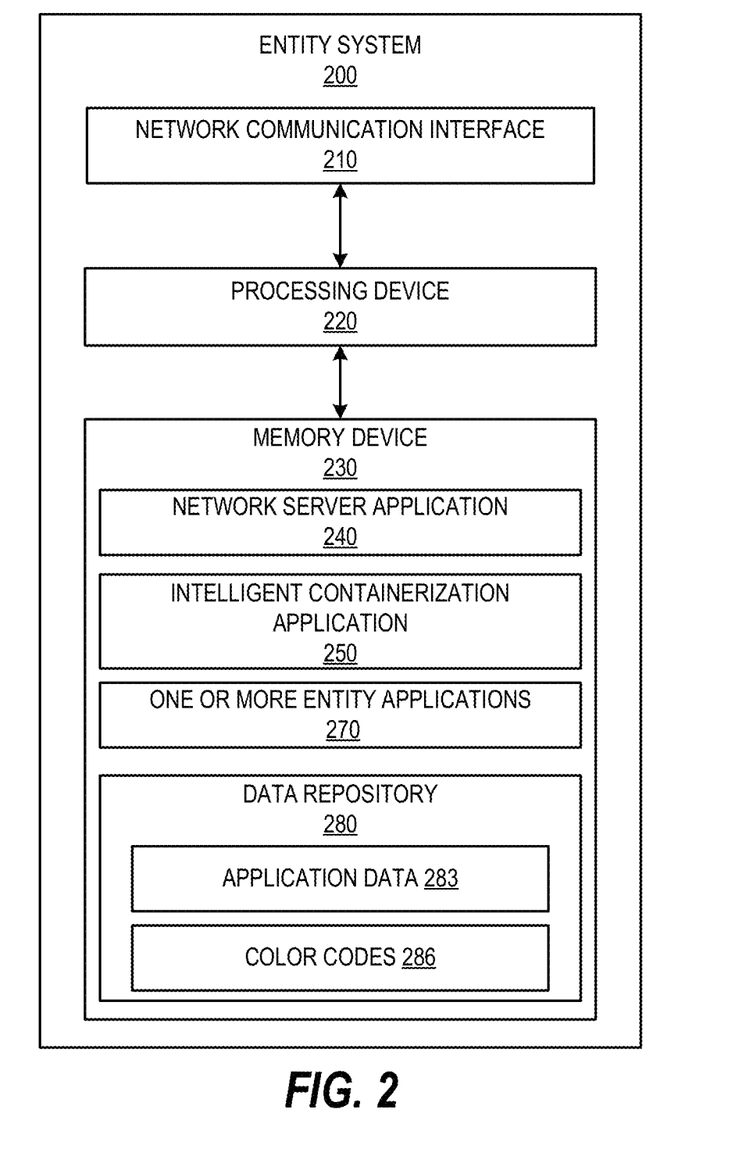
FIG. 2 provides a block diagram illustrating the one or more entity systems 200 of FIG. 1, in accordance with an embodiment of the invention.

FIG. 2 provides a block diagram illustrating the one or more entity systems 200, in greater detail, in accordance with embodiments of the invention. As illustrated in FIG. 2, in one embodiment of the invention, the one or more entity systems 200 includes one or more processing devices 220 operatively coupled to a network communication interface 210 and a memory device 230. In certain embodiments, the one or more entity systems 200 is operated by a first entity, such as a financial institution, while in other embodiments, the one or more entity systems 200 is operated by an entity other than a financial institution. In some embodiments, the entity system may be operated by any entity that is associated with developing, testing, and/or maintaining one or more applications.

It should be understood that the memory device 230 may include one or more databases or other data structures/repositories. The memory device 230 also includes computer-executable program code that instructs the processing device 220 to operate the network communication interface 210 to perform certain communication functions of the one or more entity systems 200 described herein. For example, in one embodiment of the one or more entity systems 200, the memory device 230 includes, but is not limited to, an intelligent containerization application 250, one or more entity applications 270, and a data repository 280 comprising application data 283 and color codes 286 that are associated with attributes associated with the one or more entity applications 270 via the computing device system. The one or more entity applications 270 may be any of the applications used, created, modified, and/or managed by the one or more entity systems 200. The computer-executable program code of the network server application 240, the intelligent containerization application 250, the one or more entity applications 270 to perform certain logic, data-extraction, and data-storing functions of the one or more entity systems 200 described herein, as well as communication functions of the one or more entity systems 200.

The network server application 240, the intelligent containerization application 250, and the one or more entity applications 270 are configured to store data in the data repository 280 or to use the data stored in the data repository 280 when communicating through the network communication interface 210 with the intelligent containerization platform 300, and/or the computing device system 400 to perform one or more process steps described herein. In some embodiments, the one or more entity systems 200 may be any applications developed, tested, and/or maintained by the entity associated with the one or more entity systems 200. The one or more entity systems 200 comprising System '1,' System '2,' System '3,' through System 'n' are configured to handle the maintenance associated with the one or more entity applications 270. For example, System 1,' System '2,' System '3,' through System 'n' may be production environments that are configured to roll out updates and changes to existing applications and/or to deploy new applications. The intelligent containerization application 250 may be provided by the intelligent containerization platform 300.

Figure 3:
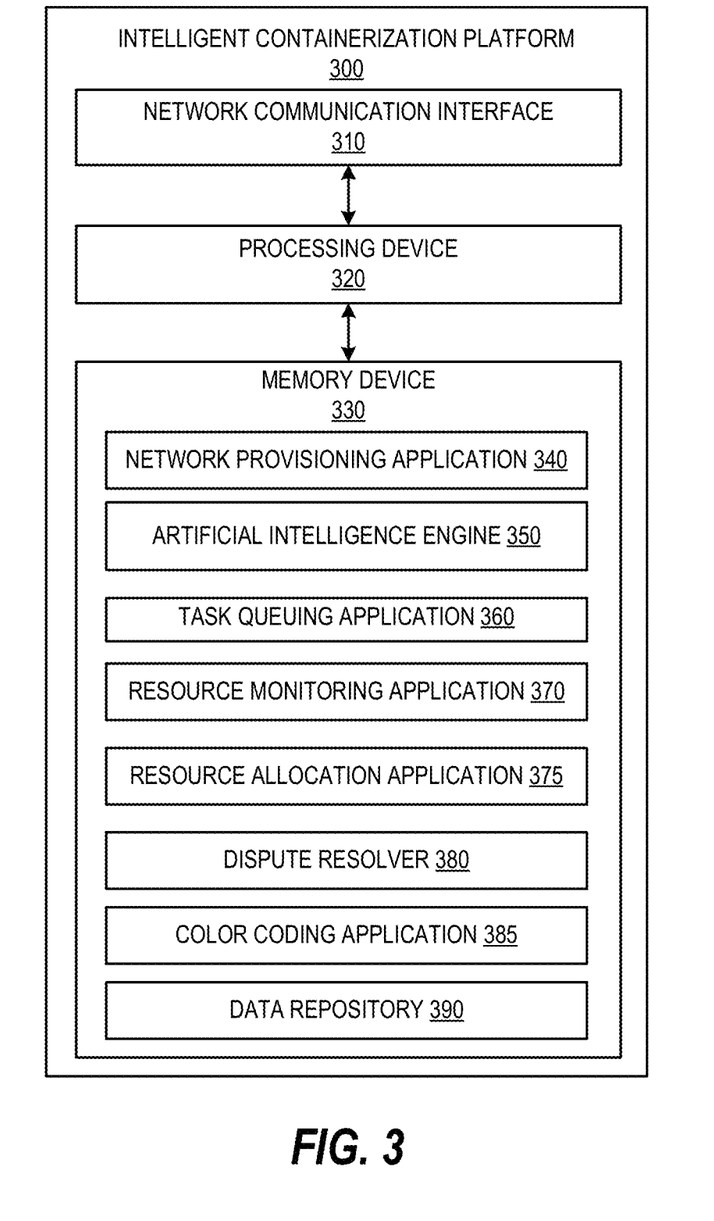
FIG. 3 provides a block diagram illustrating an intelligent containerization platform 300 of FIG. 1, in accordance with an embodiment of the invention.

FIG. 3 provides a block diagram illustrating the intelligent containerization platform 300 in greater detail, in accordance with embodiments of the invention. The intelligent containerization platform 300 oversees the utilization of one or more entity systems 200. As illustrated in FIG. 3, in one embodiment of the invention, the intelligent containerization platform 300 includes one or more processing devices 320 operatively coupled to a network communication interface 310 and a memory device 330. In certain embodiments, the intelligent containerization platform 300 is operated by a first entity, such as a financial institution, while in other embodiments, the intelligent containerization platform 300 is operated by an entity other than a financial institution. In some embodiments, the intelligent containerization platform 300 is owned or operated by the entity of the one or more entity systems 200. In some embodiments, the intelligent containerization platform 300 may be an independent system. In alternate embodiments, the intelligent containerization platform 300 may be a part of the one or more entity systems 200.

It should be understood that the memory device 330 may include one or more databases or other data structures/repositories. The memory device 330 also includes computer-executable program code that instructs the processing device 320 to operate the network communication interface 310 to perform certain communication functions of the intelligent containerization platform 300 described herein. For example, in one embodiment of the intelligent containerization platform 300, the memory device 330 includes, but is not limited to, a network provisioning application 340, artificial intelligence engine 350, a task queuing application 360, a resource monitoring application 370, a resource allocation application 375, a dispute resolver 380, a color coding application 385, and a data repository 390 comprising data processed or accessed by one or more applications in the memory device 330. The computer-executable program code of the network provisioning application 340, the artificial intelligence engine 350, the task queuing application 360, the resource monitoring application 370, the resource allocation application 375, the dispute resolver 380, and the color coding application 385 may instruct the processing device 320 to perform certain logic, data-processing, and data-storing functions of the intelligent containerization platform 300 described herein, as well as communication functions of the intelligent containerization platform 300.

The network provisioning application 340, the artificial intelligence engine 350, the task queuing application 360, the resource monitoring application 370, the resource allocation application 375, the dispute resolver 380, and the color coding application 385 are configured to invoke or use the data in the data repository 390 when communicating through the network communication interface 310 with the one or more entity systems 200, and/or the computing device system 400. In some embodiments, the network provisioning application 340, the artificial intelligence engine 350, the task queuing application 360, the resource monitoring application 370, the resource allocation application 375, the dispute resolver 380, and the color coding application 385 may store the data extracted or received from the one or more entity systems 200, and the computing device system 400 in the data repository 390. In some embodiments, the network provisioning application 340, the artificial intelligence engine 350, the task queuing application 360, the resource monitoring application 370, the resource allocation application 375, the dispute resolver 380, and the color coding application 385 may be a part of a single application.

Figure 4:
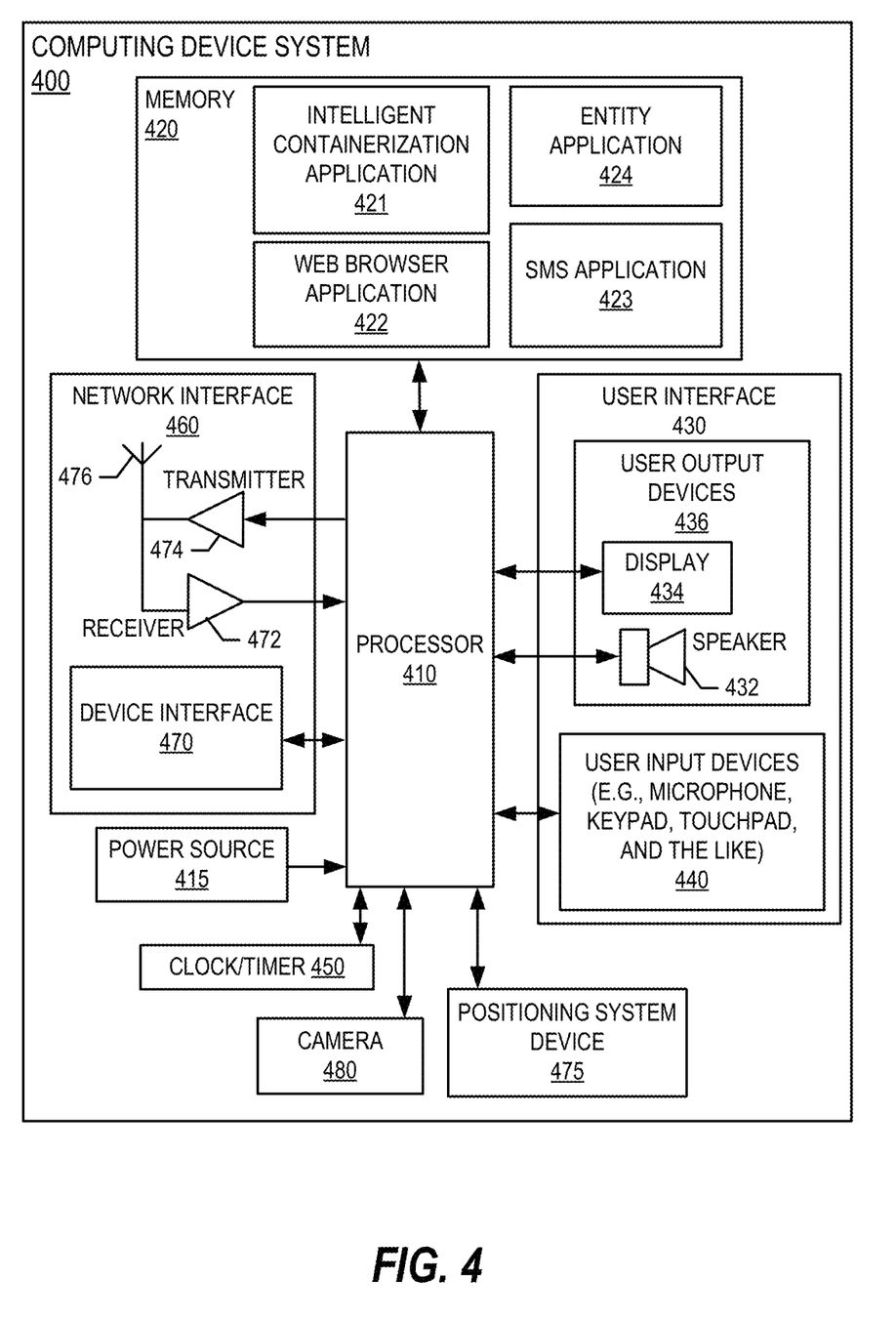
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits.

Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an intelligent containerization application 421, entity application 424. These applications also typically instructions to a graphical user interface (GUI) on the display 430 that allows the user 110 to interact with the one or more entity systems 200, the intelligent containerization platform 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the intelligent containerization application 421 provided by the intelligent containerization platform 300 allows the user 110 to access the intelligent containerization platform 300. In some embodiments, the entity application 424 provided by the one or more entity systems 200 and the intelligent containerization application 421 allow the user 110 to access the functionalities provided by the intelligent containerization platform 300 and the one or more entity systems 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
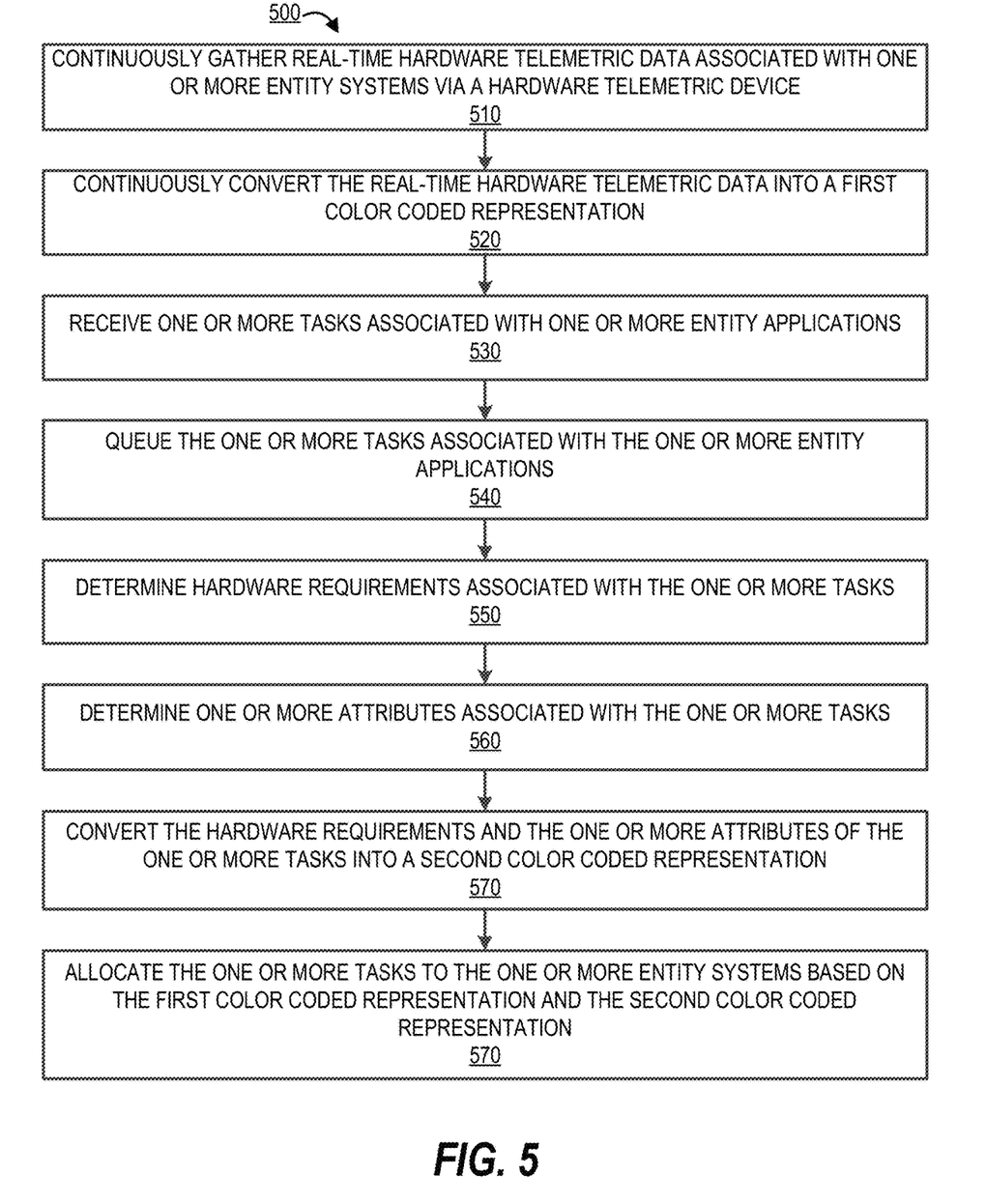
FIG. 5 provides a flowchart illustrating a process flow for intelligently optimizing the utilization of clusters, in accordance with an embodiment of the invention.

FIG. 5 provides a flowchart illustrating a process flow 500 for intelligently optimizing the utilization of clusters, in accordance with an embodiment of the invention. The system of the invention instead of allocating fixed amount of processing capacity and memory of a cluster of systems for specific applications, dynamically allocates the incoming tasks associated with one or more applications, thereby improving the overall utilization of the cluster of systems and also for efficiently completing the incoming tasks by reducing wait times and errors associated with the incoming tasks.

As shown in block 510, the system continuously gathers real-time hardware telemetric data associated with one or more entity systems via a hardware telemetric device. As described, the one or more entity systems are a cluster of systems configured to perform maintenance on one or more applications associated with an entity. For example, a first application developed or managed by the entity needs to be updated to incorporate new changes associated with the functionalities of the first application. As such, the updates need to run on a system that has processing capabilities and memory that can facilitate the updating process. The real-time hardware telemetric comprises the real-time processing capacity and memory of each of the one or more entity systems.

As shown in block 520, the system continuously converts the real-time hardware telemetric data into a first color coded representation. Every piece of hardware telemetric data is assigned a unique color representation based on the existing color codes stored in a data repository. In the case where a color code is not present, the system dynamically assigns a color code for the newly added hardware telemetric data and stores the new color code in the data repository. In some embodiments, the color codes may be three dimensional color codes.

As shown in block 530, the system receives one or more tasks associated with one or more entity applications. The one or more tasks may include updating a database, updating an application, updating a shared resource (e.g., a database, an application, or the like) that is shared by two or more applications, deploying a new application, or the like. In some embodiments, the one or more tasks may be associated with a single application. In some embodiments, the one or more tasks may be associated with multiple applications. In some embodiments, the one or more tasks may be scheduled tasks. In some embodiments, the one or more tasks may be real-time tasks. For example, a user may identify that an application has failed in real-time and may initiate a task of updating the application. Each of the one or more tasks may have different priorities based on the type of application, based on the type of task, or the like. For example, if the type of task is associated with updating an application, where the application is likely to crash without the update, such type of task is assigned high priority. In some embodiments, the system may automatically assign priority to a task based on historical data. In some embodiments, the system may assign priority to a task based on data associated with the task. In some embodiments, the data associated with the task may be submitted by a user via the computing device system. In some embodiments, the data associated with the task is extracted from a database (e.g., historical data).

As shown in block 540, the system queues the one or more tasks associated with the one or more entity applications. The system saves the incoming one or more tasks in a waiting queue.

As shown in block 550, the system determines hardware requirements associated with the one or more tasks. The hardware requirements associated with the one or tasks may include, but are not limited to, memory associated with running the task and processing capacity to run the task, or the like. In some embodiments, the system may determine the hardware requirements automatically based on the type of task and the type of application associated with the task. For example, if task is associated with updating a database related to an application, the system via an artificial intelligence engine calculates the hardware requirements based on the training received by the artificial intelligence engine. The artificial intelligence engine in some embodiments, comprises a reinforcement learning algorithm that tries to learn an optimized policy to accomplish one or more steps of the process flow described herein.

As shown in block 560, the system determines one or more attributes associated with the one or more tasks. In some embodiments, the artificial intelligence engine of the systems determines the one or more attributes. The one or more attributes may comprise shared resources data, historical abnormal execution data, input updates, output updates, and prioritization data. Shared resource data may be data related to resources that are shared by two or more applications. For example, a database may be shared by two or more applications, the system identifies such dependencies associated with the one or more tasks that are queued and that are already being run on the one or more entity systems. Historical abnormal execution data is the data associated with jobs that are similar to the current jobs that have failed or that have taken longer time to execute in the past.

As shown in block 570, the system converts the hardware requirements and the one or more attributes of the one or more tasks into a second color coded representation. Similar to the process of assigning color codes described in step 520, the system assigns color codes to the one or more attributes and the hardware requirements.

After converting the hardware telemetric data, the hardware requirements, and the one or more attributes into color coded representations, the system feeds the color coded representations into the artificial intelligence engine. As shown in block 580, the system allocates the one or more tasks to the one or more entity systems based on the first color coded representation and the second color coded representation. The system identifies the current jobs that are running currently on the one or more entity systems based on the real-time hardware telemetric data. The artificial intelligence engine of the system identifies the processing efficiency and memory that is required by the one or more tasks in the waiting queue and assigns the one or more tasks to the one or more entity systems upon determining that existing jobs running on the one or more entity systems have been completed. The artificial intelligent engine optimizes the usage of the one or more entity systems so that the waiting time of the one or more tasks in the waiting queue is significantly decreased based on the training received from the system. In an exemplary embodiment, the system may identify that a task has abnormal execution history and may allocate more execution time to the task. The system may consider each of the one or more attributes, real-time hardware telemetric data, and hardware requirements of the tasks while prioritizing and/or assigning the tasks to the entity systems. In some embodiments, the system performs dynamic fragmentation of the one or more entity systems to run multiple tasks on a single entity system. For example, the system may run a first task, a third task, and fourth task on a first entity system based on the one or more attributes, real-time hardware telemetric data, and hardware requirements of the tasks.

The system of the present invention trains the artificial intelligence engine to optimize the cluster utilization. The artificial intelligence engine dynamically allocates memory and processing capacity to the one or more tasks pending in the waiting queue and reduces the chances of failure of the one or more tasks, thereby improving the efficiency of the one or more entity systems. One or more steps described herein may be performed by the artificial intelligence engine. In some embodiments, the system may identify hidden patterns to preemptively keep an entity system available for future incoming tasks. For example, the system may identify that an application is updated for every two weeks and based on the historical execution time, may keep a first entity system available for running the task. The system also accounts for any disputes that may arise while assigning the one or more tasks to the one or more entity systems. One such exemplary embodiment is discussed in FIG. 6.

Figure 6:
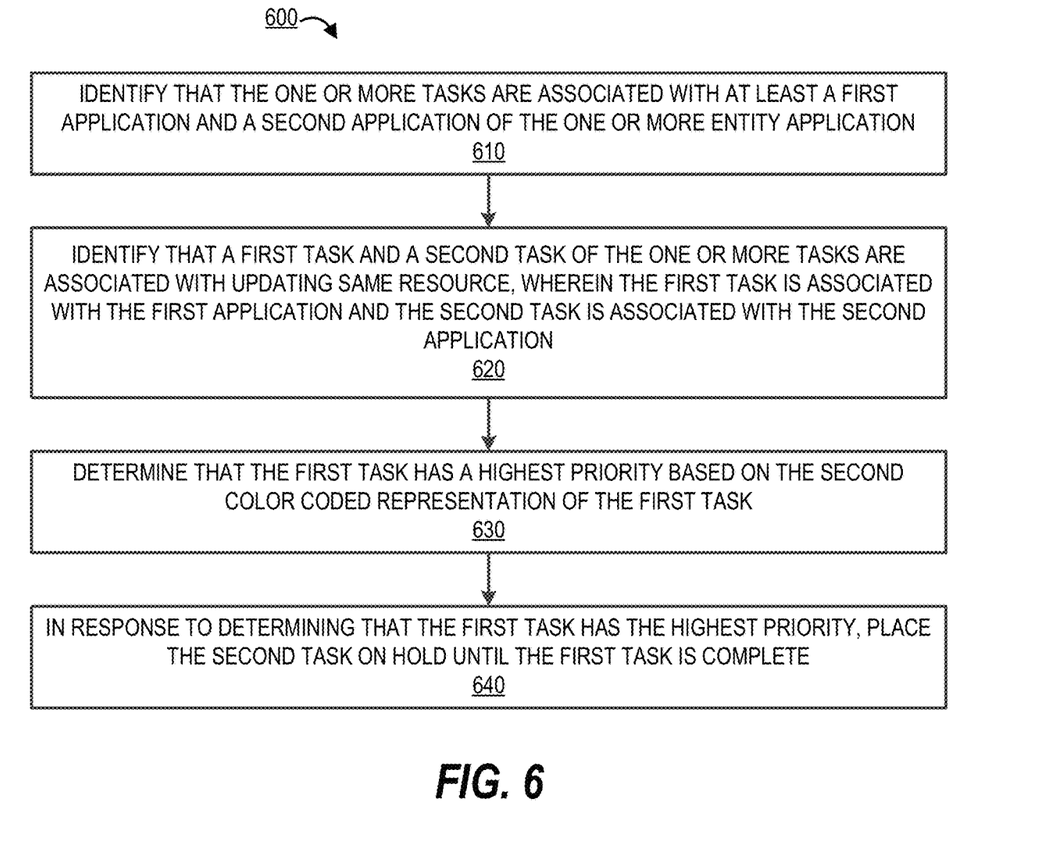
FIG. 6 provides a flowchart illustrating a process flow for resolving dispute of a resource associated with at least two tasks, in accordance with an embodiment of the invention.

FIG. 6 provides a flowchart illustrating a process flow 600 for resolving dispute of a resource associated with at least two tasks, in accordance with an embodiment of the invention.

As shown in block 610, the system identifies that the one or more tasks are associated with at least a first application and a second application of the one or more entity application. As shown in block 620, the system identifies that a first task and a second task of the one or more tasks are associated with updating same resource, wherein the first task is associated with the first application and the second task is associated with the second application. For example, the system may identify that the first task and the second task are both associated with updating a database that are shared by the first application and the second application. If both tasks are run together on different entity systems, both or either of the tasks may fail as they are associated with updating the same resource. Typically, conventional systems do not check for such disputes.

As shown in block 630, the system determines that the first task has a highest priority based on the second color coded representation of the first task. For example, the system may determine that the second task is internally dependent on the first task and may assign a highest priority to the first task. As shown in block 640, the system in response to determining that the first task has the highest priority, places the second task on hold until the first task is complete.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for intelligently optimizing the utilization of clusters, the system comprising:
   at least one network communication interface;
   at least one non-transitory storage device; and
   at least one processor coupled to the at least one non-transitory storage device and the at least one network communication interface, wherein the at least one processor is configured to:
   continuously gather real-time hardware telemetric data associated with one or more entity systems via a hardware telemetric device;
   continuously convert the real-time hardware telemetric data into a first color coded representation;
   receive one or more tasks associated with one or more entity applications;
   queue the one or more tasks associated with the one or more entity applications;
   determine hardware requirements associated with the one or more tasks;
   determine one or more attributes associated with the one or more tasks;
   convert the hardware requirements and the one or more attributes of the one or more tasks into a second color coded representation, wherein the second color coded representation is different from the first color coded representation;
   allocate the one or more tasks to the one or more entity systems based on the first color coded representation and the second color coded representation; and
   execute the allocated one or more tasks on the one or more entity systems.

2. The system of claim 1, wherein the one or more tasks are associated with at least a first application, a second application, and a third application of the one or more entity applications.

3. The system of claim 2, wherein the at least one processor is further configured to:
   identify that a first task and a second task of the one or more tasks are associated with updating same resource, wherein the first task is associated with the first application and the second task is associated with the second application; and
   place at least one of the first task and the second task on hold based on the second color coded representation associated with the first task and the second task.

4. The system of claim 3, wherein the at least one processor is further configured to:
   determine that the first task has a highest priority based on the second color coded representation of the first task; and
   in response to determining that the first task has the highest priority, place the second task on hold until the first task is complete.

5. The system of claim 1, wherein the at least one processor is further configured to allocate the one or more tasks to the one or more entity systems based on:
   determining current utilization of the one or more entity systems based on the first color coded representation;
   determining completion of existing tasks running on the one or more entity systems based on the first color coded representation; and
   in response to determining the completion of the existing tasks, dynamically assign the one or more tasks to the one or more entity systems.

6. The system of claim 1, wherein the real-time hardware telemetric data comprises at least usage data associated with processors and memory units of the one or more entity systems.

7. The system of claim 1, wherein the hardware requirements comprise at least memory, processor consumption, wherein the one or more attributes comprises at least shared resources data, historical abnormal execution data, input updates, output updates, and prioritization data.

8. A computer program product for intelligently optimizing the utilization of clusters, the computer program product comprising a non-transitory computer-readable storage medium having computer executable instructions for causing a computer processor to perform the steps of:
   continuously gathering real-time hardware telemetric data associated with one or more entity systems via a hardware telemetric device;
   continuously converting the real-time hardware telemetric data into a first color coded representation;
   receiving one or more tasks associated with one or more entity applications;
   queuing the one or more tasks associated with the one or more entity applications;
   determining hardware requirements associated with the one or more tasks;
   determining one or more attributes associated with the one or more tasks;
   converting the hardware requirements and the one or more attributes of the one or more tasks into a second color coded representation, wherein the second color coded representation is different from the first color coded representation;
   allocating the one or more tasks to the one or more entity systems based on the first color coded representation and the second color coded representation; and
   execute the allocated one or more tasks on the one or more entity systems.

9. The computer program product of claim 8, wherein the one or more tasks are associated with at least a first application, a second application, and a third application of the one or more entity applications.

10. The computer program product of claim 9, wherein the computer executable instructions cause the computer processor to:
  identify that a first task and a second task of the one or more tasks are associated with updating same resource, wherein the first task is associated with the first application and the second task is associated with the second application; and
  place at least one of the first task and the second task on hold based on the second color coded representation associated with the first task and the second task.

11. The computer program product of claim 10, wherein the computer executable instructions cause the computer processor to:
  determine that the first task has a highest priority based on the second color coded representation of the first task; and
  in response to determining that the first task has the highest priority, place the second task on hold until the first task is complete.

12. The computer program product of claim 8, wherein the computer executable instructions cause the computer processor to allocate the one or more tasks to the one or more entity systems based on:
  determining current utilization of the one or more entity systems based on the first color coded representation;
  determining completion of existing tasks running on the one or more entity systems based on the first color coded representation; and
  in response to determining the completion of the existing tasks, dynamically assign the one or more tasks to the one or more entity systems.

13. The computer program product of claim 8, wherein the real-time hardware telemetric data comprises at least usage data associated with processors and memory units of the one or more entity systems.

14. The computer program product of claim 8, wherein the hardware requirements comprise at least memory, processor consumption, wherein the one or more attributes comprises at least shared resources data, historical abnormal execution data, input updates, output updates, and prioritization data.

15. A computer implemented method for intelligently optimizing the utilization of clusters, wherein the method comprises:
  continuously gathering real-time hardware telemetric data associated with one or more entity systems via a hardware telemetric device;
  continuously converting the real-time hardware telemetric data into a first color coded representation;
  receiving one or more tasks associated with one or more entity applications;
  queuing the one or more tasks associated with the one or more entity applications;
  determining hardware requirements associated with the one or more tasks;
  determining one or more attributes associated with the one or more tasks;
  converting the hardware requirements and the one or more attributes of the one or more tasks into a second color coded representation, wherein the second color coded representation is different from the first color coded representation;
  allocating the one or more tasks to the one or more entity systems based on the first color coded representation and the second color coded representation; and
  execute the allocated one or more tasks on the one or more entity systems.

16. The computer implemented method of claim 15, wherein the one or more tasks are associated with at least a first application, a second application, and a third application of the one or more entity applications.

17. The computer implemented method of claim 16, wherein the method further comprises:
  identifying that a first task and a second task of the one or more tasks are associated with updating same resource, wherein the first task is associated with the first application and the second task is associated with the second application; and
  placing at least one of the first task and the second task on hold based on the second color coded representation associated with the first task and the second task.

18. The computer implemented method of claim 17, wherein the method further comprises:
  determining that the first task has a highest priority based on the second color coded representation of the first task; and
  in response to determining that the first task has the highest priority, placing the second task on hold until the first task is complete.

19. The computer implemented method of claim 15, wherein allocating the one or more tasks to the one or more entity systems is based on:
  determining current utilization of the one or more entity systems based on the first color coded representation;
  determining completion of existing tasks running on the one or more entity systems based on the first color coded representation; and
  in response to determining the completion of the existing tasks, dynamically assign the one or more tasks to the one or more entity systems.

* * * * *